United States Patent [19]

Sheptak

[11] 4,429,015
[45] Jan. 31, 1984

[54] MULTI-PLY LAMINAE AND IDENTIFICATION CARD

[75] Inventor: Nicholas Sheptak, Appleton, Wis.

[73] Assignee: American Can Company, Greenwich, Conn.

[21] Appl. No.: 364,395

[22] Filed: Apr. 1, 1982

Related U.S. Application Data

[62] Division of Ser. No. 139,656, Apr. 14, 1980, Pat. No. 4,343,851.

[51] Int. Cl.³ .......................... B23B 7/02; B23B 27/16
[52] U.S. Cl. ...................................... 428/201; 40/625; 40/626; 40/630; 283/107; 283/108; 428/203; 428/212; 428/480; 428/483; 428/516; 428/910; 428/916
[58] Field of Search .................. 40/2.2, 625, 626, 630; 283/7, 8 R, 9 R, 72, 74, 94, 107–111; 264/288.4; 428/13, 68, 76, 203, 204, 212, 343, 347, 349, 354, 412, 474.4, 475.2, 476.3, 476.9, 480, 483, 515–520, 910, 916, 201

[56] References Cited

U.S. PATENT DOCUMENTS 3,595,736  7/1971  Buteux ............................. 428/910
3,684,635  8/1972  Staats ............................... 428/76
3,869,533  3/1975  Janocha et al. .................... 264/147

Primary Examiner—Bruce H. Hess
Attorney, Agent, or Firm—Ernestine C. Bartlett; Stuart S. Bowie

[57] ABSTRACT

Multi-ply laminae are provided which are suitable for use as tell-tale indicators for identification cards, credentials and the like. The laminae are post-laminated to a core layer bearing a photograph or similar information or indicia. Thereafter attempts to delaminate the card result in fibers being torn from a uniaxially oriented polyethylene or polypropylene layer of the laminae. Attempts to readhere the layers with adhesives result in tell-tale indicia in the form of the torn fibers which cannot be adequately realigned or adhered so as to be unnoticeable. Moreover, attempts to heat seal the card after tampering causes the oriented polymer to shrink and opacify resulting in additional tell-tale indicia of tampering. In addition, the core comprises heat seal surfaces upon which printing and other indicia is placed whereby any attempt to alter the printing or other indicia results in destruction of the card.

14 Claims, 5 Drawing Figures

MULTI-PLY LAMINAE AND IDENTIFICATION CARD

This is a division of application Ser. No. 139,656, filed Apr. 14, 1980, now U.S. Pat. No. 4,343,851.

BACKGROUND OF THE INVETION

1. Prior Art

The Prior art is believed best exemplified by the following patents:

Hannon, U.S. Pat. No. 2,934,030, May 1961
Hannon, U.S. Pat. No. Re. 25,005, July 1961
Rudershausen, U.S. Pat. No. 3,279,826, October 1966
Hannon, U.S. Pat. No. 3,413,171, November 1968
Hannon, U.S. Pat. No. 3,417,497, December 1968
Peters, U.S. Pat. No. 3,457,661, July 1969
Conner, U.S. Pat. No. 3,566,521, March 1971
Thomas, U.S. Pat. No. 3,582,439, June 1971
Thomas, U.S. Pat. No. 3,614,839, October 1971
Staats, U.S. Pat. No. 3,684,635, August 1972
Staats, U.S. Pat. No. 3,836,414, September 1974
Whitehead, U.S. Pat. No. 4,097,279, June 1978

2. Field of the Invention

This invention relates to multi-ply laminae and to the use of such laminae as post-laminations for identification cards, credentials and the like.

Numerous cards have been proposed which are designed to identify their holders to others. Typical examples are credit cards provided by department stores, service stations and the like; driver's licenses; identification badges such as those used to identify plant, government or school personnel or students; passports, visas and many other uses. To be satisfactory for use use, it is important that the cards, etc. be of such a nature that they cannot be counterfeited or tampered with or successfully altered without destroying or defacing the card so as to render the tampering or alteration noticeable. Unfortunately, providing such a tell-tale feature has not been wholly accomplished. Typical laminated cards may be cut with a knife or razor blade or delaminated with a solvent after which indicia or photograps can be substituted and the card readhered or relaminated without detection.

Several proposals have been made in the art for a tell-tale or tamper-proof identification card, i.e. a card that is not susceptible to alteration without ready detection. Proposals suggested have included, for example, magnetic tapes or coatings laminated on the surface of the card with a particular code sequence; invisible ultraviolet screening agents which become visible under fluorescent light; printed grids disposed between two layers of thermoplastic bonding material bonded so that identifying indicia is encased within bonding material which becomes distorted and/or destroyed upon application of heat or solvent, etc. Many of these proposals are ineffective and others, although effective require special detection equipment and offer detectability at prohibitive expense.

SUMMARY OF THE INVENTION

This invention relates to tell-tale, tamperproof identification cards or the like that comprise a device that permits ready detection of changes resulting from attempts to tamper with the card. Moreover, the tell-tale device is provided through the use of multi-ply laminations that permit the use of relatively inexpensive materials that result in more economical manufacture of the card.

The invention provides multi-ply laminae which function as tell-tale indicators when used as components of indentification cards and the like. In one embodiment, the laminae are multi-ply extrusion laminations consisting essentially of an outer layer of a thermoplastic material bonded to at least one layer of a uniaxially oriented polymer material having a with-grain to cross-grain tensile strength ratio greater than about 4 to 1 and preferably greater than about 10 to 1, and a maximum elongation in both with-grain and cross-grain directions of no more than 150% whereby said material defibrillates and/or tears upon delamination from the multi-ply structure. In an alternative embodiment, the laminae are adhesively laminated or bonded.

More particularly, the extrusion laminae comprise (a) an outer layer of a thermoplastic material capable of providing rigidity, clarity, chemical resistance and high temperature resistance; optionally, (b) a primer for promoting adhesion of the outer layer to the next succeeding layer; (c) at least one heat-sealing or bonding material capable of bonding said outer layer to the next succeeding layer; (d) at least one layer of said uniaxially oriented polymer material described hereinabove and (e) at least one heat sealing or bonding material capable of bonding to said oriented polymer layer and to itself. Alternatively, the outer layer comprises thermoplastic material adhesively bonded or laminated to uniaxially oriented polymer material described hereinabove and to which at least one heat sealing or bonding material capable of bonding to said oriented polymer layer is adhered.

DESCRIPTION OF THE PREFERRED EMBODIMENTS

Figure 1:
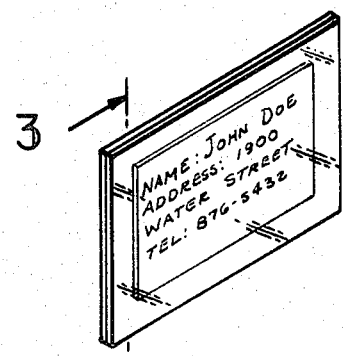
FIG. 1 is a plan view of an identification card of the invention.
Figure 2:
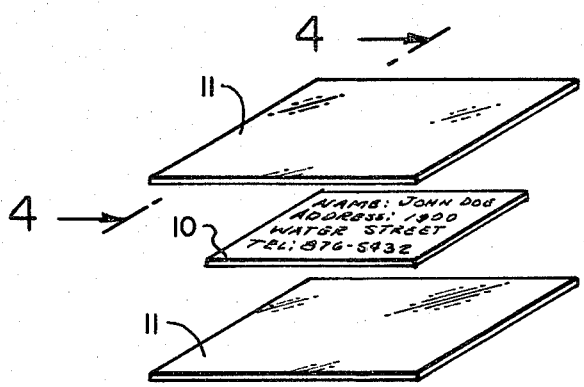
FIG. 2 illustrates a core positioned with respect to multi-ply laminae of the invention.
Figure 3:
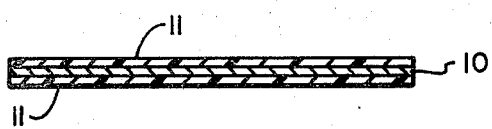
FIG. 3 is an enlarged cross-sectional view, taken along line 3—3 of FIG. 1.
Figure 4:
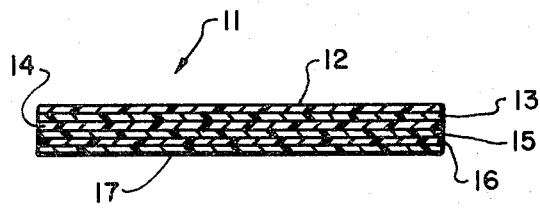
FIG. 4 is a cross-sectional view of a multi-ply lamination of the invention, taken along line 4—4 of FIG. 2.

Multi-ply laminations according to the invention consist essentially of (a) an outer layer capable of providing rigidity, clarity, chemical resistance and high temperature resistance; (b) at least one layer of a uniaxially oriented polymer material having a with-grain to cross-grain tensile strength ratio greater than about 4 to 1, preferably greater than 10 to 1, and a maximum elongation in both with-grain and cross-grain directions of less than 150%, (c) at least one sealant or bonding material effective to bond said oriented polymer to said outer protective layer; and (d) at least one sealant or bonding material effective to bond said oriented polymer film layer to a core comprising an information-bearing substrate.

In the more specific and preferred embodiments, heat sealing or bonding materials and/or primers may be employed to insure maximum interply adhesion and sealability to an identification card or core component, i.e. an information-bearing substrate.

With reference to the drawings, there is illustrated an identification card, credential or the like, 1, which comprises a core component 10 sandwiched and sealed to multi-ply extrusion laminae 11 on its front and rear surfaces.

The principal purpose of the core is to provide identifying information either in the form of printed indicia, photograph or any other form of identifying information. The core should preferably comprise a material that has surface properties such that it may be uniformly joined by lamination with thermoplastic bonding layers of the multi-ply laminae of the invention. Any known material commonly used for this purpose may be used including paper, cardboard, aluminum, steel, glass, polymers such as polyamides, polyethylene glycol esters of terephthalic acid, woven materials, polyvinyl chloride and combinations of the same. The core may be unitary and span the entire length and width of the card or it may comprise merely a small photograph with indicia mounted on plastic film or it may comprise a plurality of entities separated by sections containing only film laminated or bonded to film. It may be transparent or colored and opaque or comprise sections of both transparent and colored entities. Preferably, the core will be polyester with sealant on both sides, the sealant being low density polyethylene, ethylene-ethacrylate, ethylene-acrylic acid or other sealants well known in the art. An added measure of tamperproofness is accomplished by printing on the sealant surface, since any attempt to separate the card to alter the information will result in destruction of the card.

The laminae may be bonded to one or both surfaces of the core. Where bonded to only one surface, it will be bonded to the information bearing surface of the core. Moreover, when the core is paper or paperboard, since the paper component is easily susceptible to alteration, it is preferred that the paper core be totally encapsulated by front and back laminations.

In the most preferred embodiment of the invention, the preferred polyester core 10 bearing printing or a photograph or other identifying indicia, is sandwiched and encapsulated by multi-ply post laminations 11 which, together with printing on the heat seal surface of the core, form the gist of this invention.

The critical components of the multi-ply laminations are the outer protective layer, the layer of uniaxially oriented polymer that constitutes the tell-tale feature and the sealant or bonding materials effective to bond the outer protective layer to said oriented polymer layer and to said core.

The outer protective layer 12 will typically be a polyester such as a polyethylene glycol ester of terephthalic acid available commercially as Mylar, or oriented polyamides such as oriented Nylon, oriented polypropylene, acrylonitrile, polycarbonate and the like of which polyester is preferred. If desired, the outer layer may be coated or otherwise treated with a primer 13, which promotes adhesion of the outer layer to the next succeeding layer of the laminae. Suitable primers include polyethylene imine available commercially as CHEMI-CAT P-145 from ALCOLAC; polyester/polyurethanes available commercially as Morton's ADCOTE from Morton Chemical Co., etc.

The layer 14, as illustrated, is a sealant or bonding material effective to bond said protective outer layer to the next succeeding layer. Any heat sealant or bonding mateial so effective may be used. Typical examples of materials suitable for such purpose include low and medium density polyethylene, ethylene-vinyl acetate copolymer, ethylene-acrylic acid copolymer or ionomer such as SURLYN, available from DuPont and comprising copolymers of $\alpha,\beta$-ethylenically unsaturated carboxylic acids having 3 to 8 carbon atoms wherein 10% to 90% of the carboxylic acid groups are neutralized with metal ions. The preferred sealant is low density polyethylene.

Layer 15 is bonded on one side to the outer protective layer through sealant layer 14. To be satisfactory for use in this invention, the film comprising layer 15 must be produced from a polymer capable of a high degree of orientation along a given axis. Such orientation is preferably achieved by compression-rolling of the film while stretching the film linearly between nips or surfaces operating at different speeds. Suitable uniaxial orientation may also be obtained by uniaxially stretching the polymer by passing the film over increasing speed rollers, etc. High density polyethylene, polypropylene, polyacrylonitrile, acrylonitrile-butadiene-styrene terpolymer and polyvinyl chloride are typical of suitable materials for this use with high density polyethylene and polypropylene being especially preferred.

Orientation along a single axis results in the predominant alignment of the chain axis of the molecules parallel to the orientation direction giving great strength in that direction. The resultant lack of molecules aligned in the direction perpendicular to the direction of orientation results in weak bonds in the transverse direction. The uniaxial orientation of molecules thus amounts for great differences in tear strength between the with-grain axis and the cross-grain axis of the film. Generally, the with-grain to cross-grain tensile strength ratio should be greater than 4 to 1 and preferably greater than about 10 to 1. Additionally, the film should be capable of no more than very moderate elongation in either the machine or the transverse direction so that it will tend to break rather than to stretch. Optimally, the degree by which the film may be stretched in either direction prior to reaching its breaking point should be no more than about 150% of its original length. Film oriented to have a tensile strength differential of less than about 4 to 1 or an elongation of substantially more than 150% will not be effective. The most desirable uniaxially oriented films for use in this invention will tear very easily in the with-grain direction or parallel to the axis of orientation whereas it is very difficult to tear the film across the grain or perpendicular to the axis of orientation.

Figure 5:
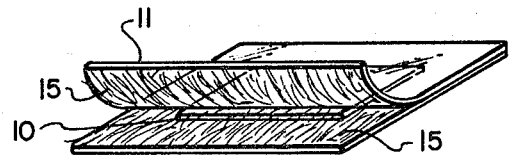
FIG. 5 illustrates a partially delaminated identification card showing the tell-tale defibrillation of the oriented polymer.

Suitable film may be oriented by fluid, compression rolling in accordance with the process set forth in U.S. Pat. No. 3,504,075. Due to its method of manufacture, the preferred high density polyethylene, for example, is converted from an opaque film to a high clarity film. Such high clarity film when employed in the multi-ply laminae of the invention provides the tell-tale feature of the invention. Attempts to delaminate the finished card result in fibers being torn from the layer 15 (See FIG. 5) and such torn fibers cannot be readhered with adhesive so as to be unnoticeable. If heat sealing is used in an attempt to readhere the laminations, the heat required for bonding causes the film comprising the layer 15 to lose its orientation resulting in shrinkage and opacification leaving tell-tale signs that are readily visible providing easy indication that alterations have been made or attempted.

Layer 15 is bonded to heat sealing or bonding layer 16 which may be selected from known sealants as listed above for layer 14 and is preferably comprised of low density polyethylene. It is to be understood, however, that layers 14 and 16 may be different sealants.

The final layer 17 may be comprised of any material that is capable of bonding to the oriented polymer, to the core and, preferably, to itself. Suitable materials are known sealants such as low density polyethylene, ethylene-ethacrylate, ethylene methacrylate, ethylene-acrylic acid copolymer, ethylene-vinyl acetate copolymers, inomers such as SURLYN, etc.

The multi-ply laminae are preferably prepared by extrusion lamination techniques.

To avoid premature shrinkage and/or tell-tale changes of the oriented film during manufacture of the laminae or during encapsulation of the core, it is necessary that the oriented film comprising the layer 15 be heat-set after orientation. This may be accomplished by annealing the film at high temperature below its melt point while holding it under tension.

Thicknesses of the various layers may conform to those conventionally used in the credit card, credential or identification card art, i.e. any suitable thickness card may be produced. For example, the variations may range from 0.5 to 7 mils for the outer protective layer 12 to 1.0 to 10 mils of the combined remaining layers.

The oriented film can be employed to replace a portion of the polyester used in the various constructions contemplated by the invention. Such substitution of the oriented film for the more expensive polyester, for example, reduces the cost of producing the laminae and identification cards.

A typical laminae and I.D. card may be produced as follows:

Mylar polyester film and uniaxially oriented polyethylene film, the latter having been heat set at 250° F., were each subjected to electrostatic treatment to improve adhesion. The electrotreated side of the Mylar polyester film was primed by coating with polyethyleneimine primer at a coating weight of less than 1 lbs./ream after which it was extrusion laminated to the treated side of the oriented polyethylene using low density polyethylene as the material bonding the oriented polyethylene to the primed Mylar. The polyethylene bonding material was employed at a weight of about 10 lbs./ream. The unbonded side of the oriented polyethylene film was then extrusion coated with approximately 12 lbs./ream of low density polyethylene which in turn was extrusion coated with approximately 22 lbs./ream of ethylene ethacrylate.

In this form, the laminate may be wound and stored or utilized as post-laminations in the production of identification cards as hereinabove defined.

To produce the I.D. card, a core comprising any conventional information bearing or identifying card, photo, laminated photo, etc. was encapsulated by sandwiching the same between two layers of the post laminae film prepared hereinabove and sealed under heat and pressure. For example, the ethylene-ethacrylate surfaces of the respective film were heat sealed at a temperature of about 325° F. under a pressure of about 40 psi for 3 seconds.

Excellent interply and heat seal adhesion was obtained when utilizing the extrusion laminating method.

When the procedure was repeated but employing Morton's 76 RB-16 or DeSoto Chemical Company's EPS-71, (two-package polyester adhesives with isocyanate acclerators) to adhesive laminate the polyester to the uniaxially oriented polyethylene, good ashesion of the polyester to the oriented polyethylene was obtained. Suitable structures were produced comprising polyester/adhesive/oriented polymer/adhesive/sealant layers and polyester/adhesive/oriented polymer/low density polyethylene/oriented polymer/adhesive/sealant layers, etc.

It will be seen that the invention provides post-laminations capable of providing tell-tale indicia and suitable for use as components of credentials, identification cards and the like.

While various embodiments of the invention have been described, it will be undersood that other modifications may be made without departing from the scope of the appended claims.

I claim:

1. An identification card consisting essentially of a core layer comprising an information bearing substrate having bonded to at least the top surface thereof a multi-ply lamination comprising (a) an outer protective layer of a thermoplastic material, capable of providing clarity, chemical and high temperature resistance and rigidity to the laminar structure; (b) at least one layer of a uniaxially oriented polymer material having a with-grain to cross-grain tensile strength ratio greater than about 4 to 1 and a maximum elongation in both with-grain and cross-grain directions of less than 150% selected from the group consisting of high density polyethylene, polypropylene, polyacrylonitrile, acrylonitrile-butadiene-styrene terpolymer and polyvinylchloride; (c) at least one heat sealant or bonding material effective to bond said uniaxially oriented polymer film layer to said outer protective layer; and (d) at least one sealant or bonding material effective to bond said uniaxially oriented film layer to said core layer comprising an information-bearing substrate, said oriented film layer being heat set after uniaxial orientation whereby said uniaxially oriented polymer film layer provides a telltale indication of tampering and results in defibrillation upon attempted delamination of the card structure.

2. An identification card as claimed in claim 1 in which said core layer comprises a polyester film having a sealant layer adhered to its top and bottom surfaces.

3. An identification card as claimed in claim 2 in which at least one of said sealant layers bears printed indicia on its surface.

4. An identification card as claimed in claim 2 in which said sealant is low density polyethylene.

5. An identification card as claimed in claim 4 in which said core layer is encapsulated between two layers of said multi-ply lamination.

6. An identification card as claimed in claim 5 in which said layers of multi-ply lamination each comprise a layer of uniaxially oriented polyethylene or polypropylene having a with-grain to cross-grain tensile strength ratio greater than 10 to 1 bonded on each side to a layer of low density polyethylene sealant, said one side of said polyethylene sealant being bonded to an outer protective layer of a polyethylene glycol ester of terephthalic acid and said other side of polyethylene sealant being bonded to said core layer.

7. An identification card as claimed in claim 6 in which said multi-ply laminations are extrusion laminations.

8. An identification card as claimed in claim 6 in which said multi-ply laminations are adhesively bonded laminations.

9. An identification card as claimed in claim 1 in which said outer layer is selected from the group consisting of polyethylene glycol ester of terephthalic acid, oriented polyamide, oriented polypropylene, acrylonitrile, and polycarbonate; said uniaxially oriented polymer material is high density polyethylene; and said heat sealant or material bonding said outer layer and oriented film layer is selected from the group consisting of ethylene vinylacetate, low density polyethylene, medium density polyethylene, ethylene acrylic acid, and copolymers of α, B-ethylenically unsaturated carboxylic acids having 3 to 8 carbon atoms wherein 10% to 90% of the carboxylic groups are neutralized with metal ions.

10. An identification card as claimed in claim 9 in which said outer layer material is polyethylene glycol ester of terephthalic acid extrusion laminated to low density polyethylene.

11. A tamper-proof, tell-tale identification card consisting essentially of a core layer comprising a polyester substrate bonded on each side to a sealant layer, at least one of the sealant layers bearing printing or identifying indicia on its surface, said core being encapsulated between layers of multi-ply laminations comprising a layer of uniaxially oriented polyethylene or polypropylene having a with-grain to cross-grain tensile strength ratio greater than 10 to 1 bonded on each side to a layer of low density polyethylene sealant, one side of said polyethylene sealant layer being bonded to an outer protective layer of a polyethylene glycol ester of terphthalic acid and the other side of polyethylene sealant layer being bonded to said core layer; said oriented polymer layer being heat set after uniaxial orientation whereby said oriented polymer layer provides a tell-tale indication of tampering and results in defibrillation upon attempted delamination of the card structure.

12. A tamper-proof, tell-tale identification card as claimed in claim 11 in which said multi-ply laminations are extrusion laminations.

13. A tamper-proof, tell-tale identification card as claimed in claim 11 in which said multi-ply laminations are adhesion laminations.

14. An identification card characterized in defibrillation of a layer thereof upon delamination, comprising: a layer of uniaxially oriented high density polyethylene or polypropylene, having a with-grain to cross-grain tensile strength ratio greater than about 10 to 1 and a maximum elongation in both directions of less than 150%, bonded on one side to a layer of polyethylene glycol ester of terephthalic acid, and on the other side to a heat sealant or bonding material effective to bond said oriented film layer which in turn is bonded to a core comprising an information-bearing substrate; said oriented polymer being adhered to said polyester through a layer of bonding material interposed between said oriented polymer and said polyester layers, said oriented polymer layer being heat set after uniaxial orientation so that said uniaxially oriented layer defibrillates upon delamination.

* * * * *